United States Patent
Marcantoni

(10) Patent No.: US 10,183,772 B2
(45) Date of Patent: Jan. 22, 2019

(54) MACHINE AND METHOD FOR ORIENTING CONTAINERS

(71) Applicant: MAKRO LABELLING S.r.l., Goito (IT)

(72) Inventor: Simone Marcantoni, Ponti sul Mincio (IT)

( * ) Notice: Subject to any disclaimer, the term of this patent is extended or adjusted under 35 U.S.C. 154(b) by 0 days.

(21) Appl. No.: 15/529,909

(22) PCT Filed: Oct. 29, 2015

(86) PCT No.: PCT/IB2015/058364
§ 371 (c)(1),
(2) Date: May 25, 2017

(87) PCT Pub. No.: WO2016/083920
PCT Pub. Date: Jun. 2, 2016

(65) Prior Publication Data
US 2018/0170596 A1    Jun. 21, 2018

(30) Foreign Application Priority Data
Nov. 27, 2014   (IT) .............................. VR2014A0292

(51) Int. Cl.
*B65G 47/24*       (2006.01)
*B65B 35/58*       (2006.01)
*B65C 9/06*        (2006.01)
*B67B 3/26*        (2006.01)
*B67C 3/00*        (2006.01)

(52) U.S. Cl.
CPC .............. *B65B 35/58* (2013.01); *B65C 9/067* (2013.01); *B67B 3/26* (2013.01); *B67C 3/007* (2013.01); *B65G 47/24* (2013.01)

(58) Field of Classification Search
CPC .......... B65G 47/24; B65G 47/244; B65C 9/06
USPC ................................... 198/394, 379
See application file for complete search history.

(56) References Cited

U.S. PATENT DOCUMENTS

| 4,124,112 A | * | 11/1978 | Mohney | ............... | B65G 47/847 |
| | | | | | 198/394 |
| 4,362,594 A | * | 12/1982 | Nagano | ..................... | B65C 3/16 |
| | | | | | 156/567 |
| 4,428,474 A | * | 1/1984 | Gau | ........................ | B65C 9/067 |
| | | | | | 198/376 |
| 5,058,724 A | * | 10/1991 | Hinton | .................... | B65C 9/067 |
| | | | | | 198/376 |

(Continued)

FOREIGN PATENT DOCUMENTS

WO      03/024808    *   3/2003  ............... B65C 9/06

*Primary Examiner* — James R Bidwell
(74) *Attorney, Agent, or Firm* — Workman Nydegger

(57) ABSTRACT

A machine for moving containers to be processed along a feed path. Containers are fed to an infeed station and an infeed transfer unit. The infeed transfer unit is configured to pick up one container at a time and carry it to a loading station of a carousel. The carousel includes supports for the containers. A detector detects an initial orientation of each container. A control unit calculates the angle of rotation of each support in order to orient each container loaded on a support of the carousel in a final predetermined orientation as a function of the initial orientation detected by the detector and the movement of the transfer unit. The support is rotated by the calculated angle of rotation.

12 Claims, 19 Drawing Sheets

(56) References Cited

U.S. PATENT DOCUMENTS

| | | | | |
|---|---|---|---|---|
| 5,478,422 A | * | 12/1995 | Bright | B65C 3/16 156/351 |
| 6,793,755 B2 | * | 9/2004 | Schaupp | B65C 9/04 198/394 |
| 8,104,376 B2 | * | 1/2012 | Eder | B65C 9/00 74/813 R |
| 8,994,959 B2 | * | 3/2015 | Beckhaus | B41F 17/18 356/138 |

\* cited by examiner

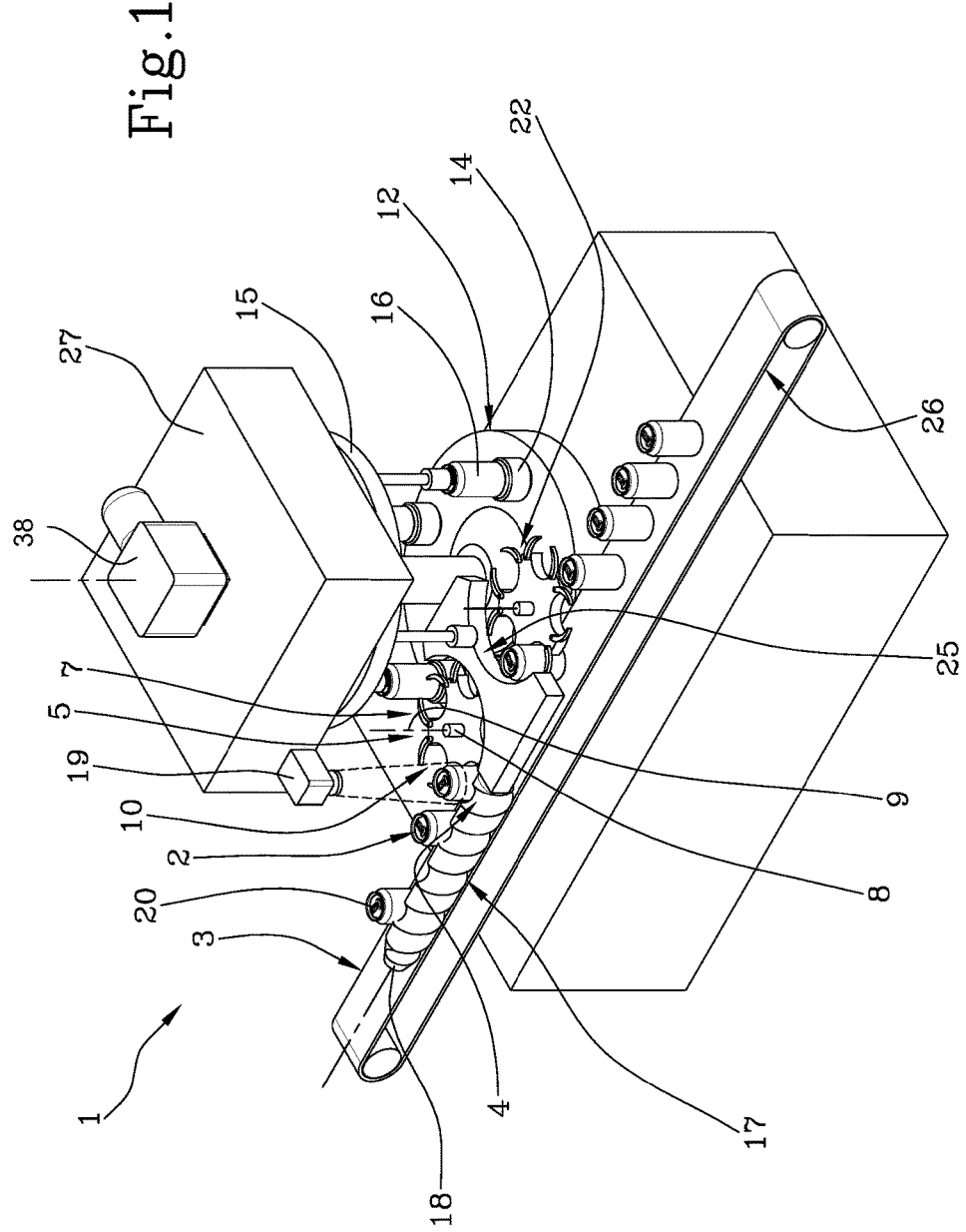

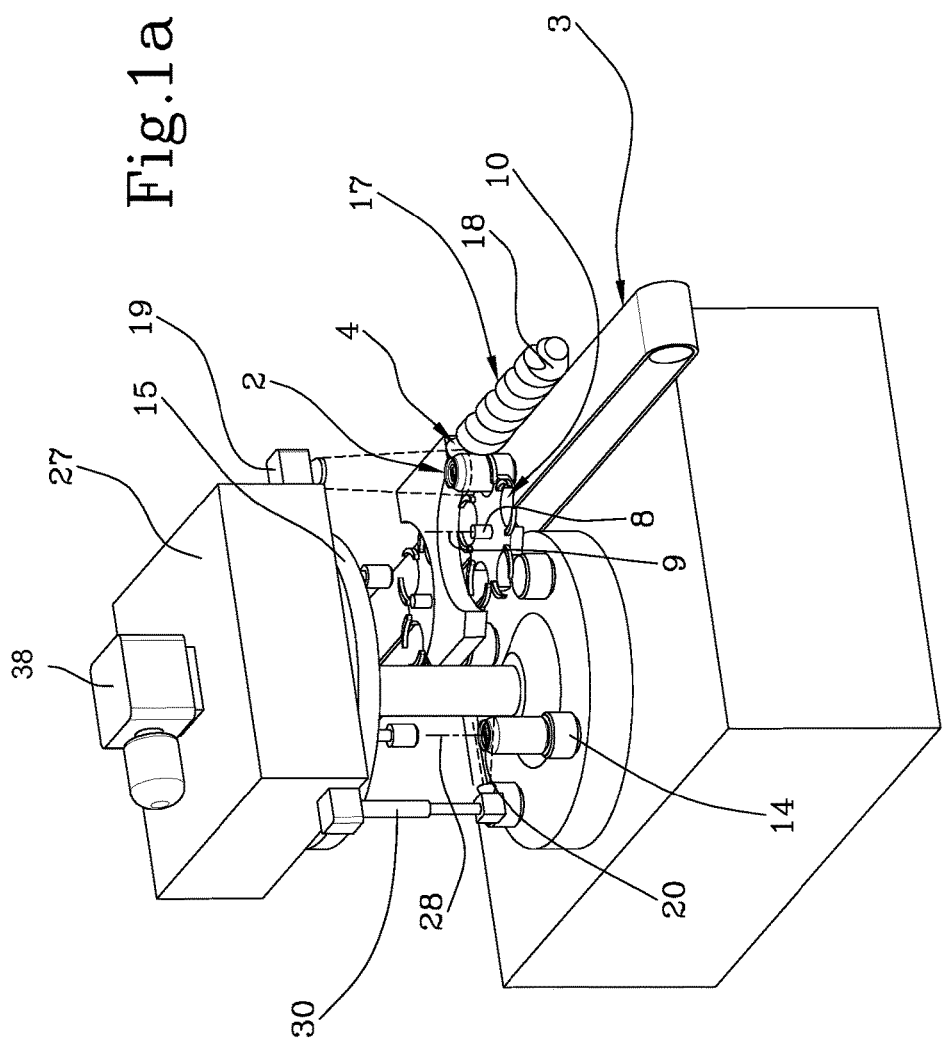

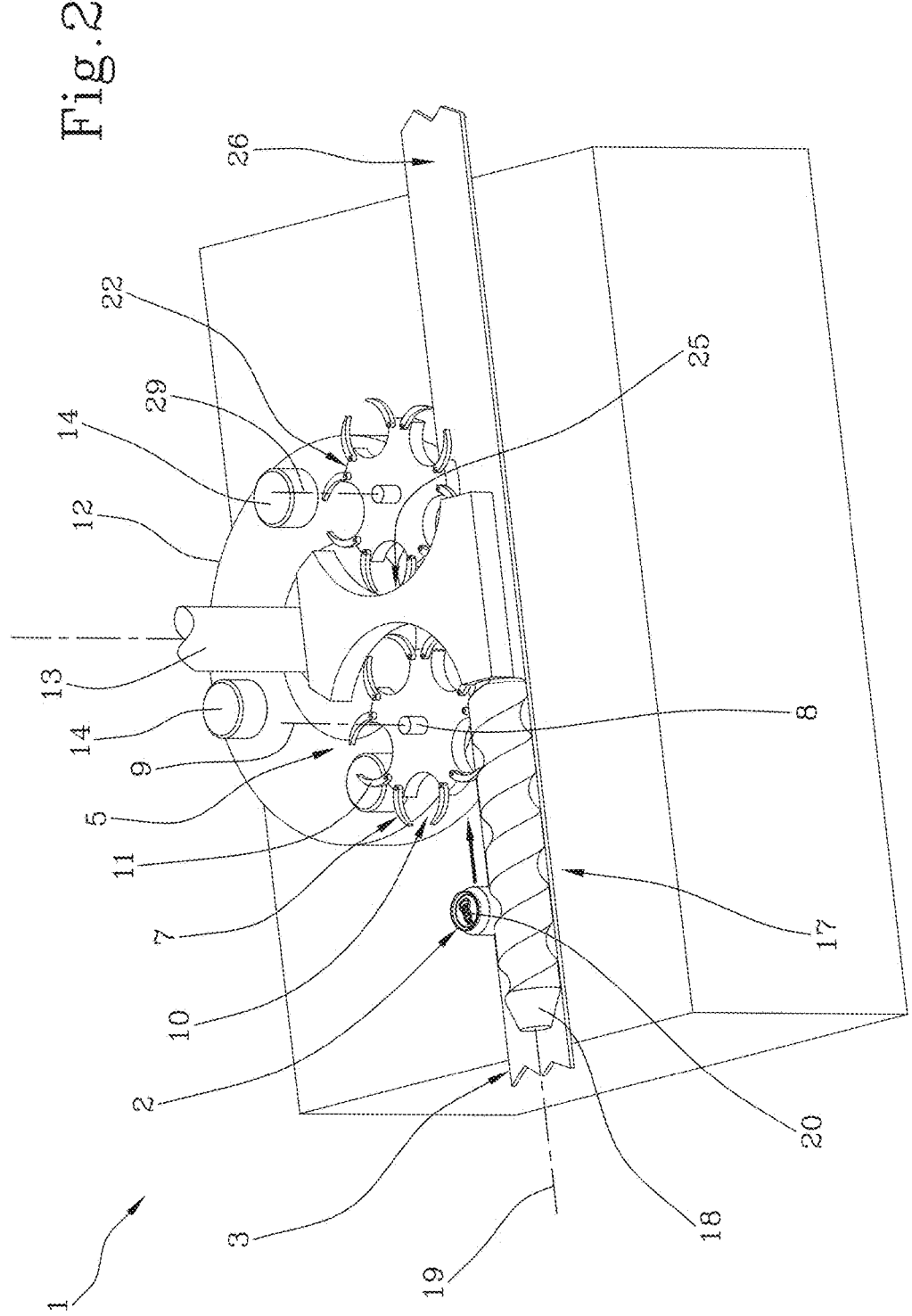

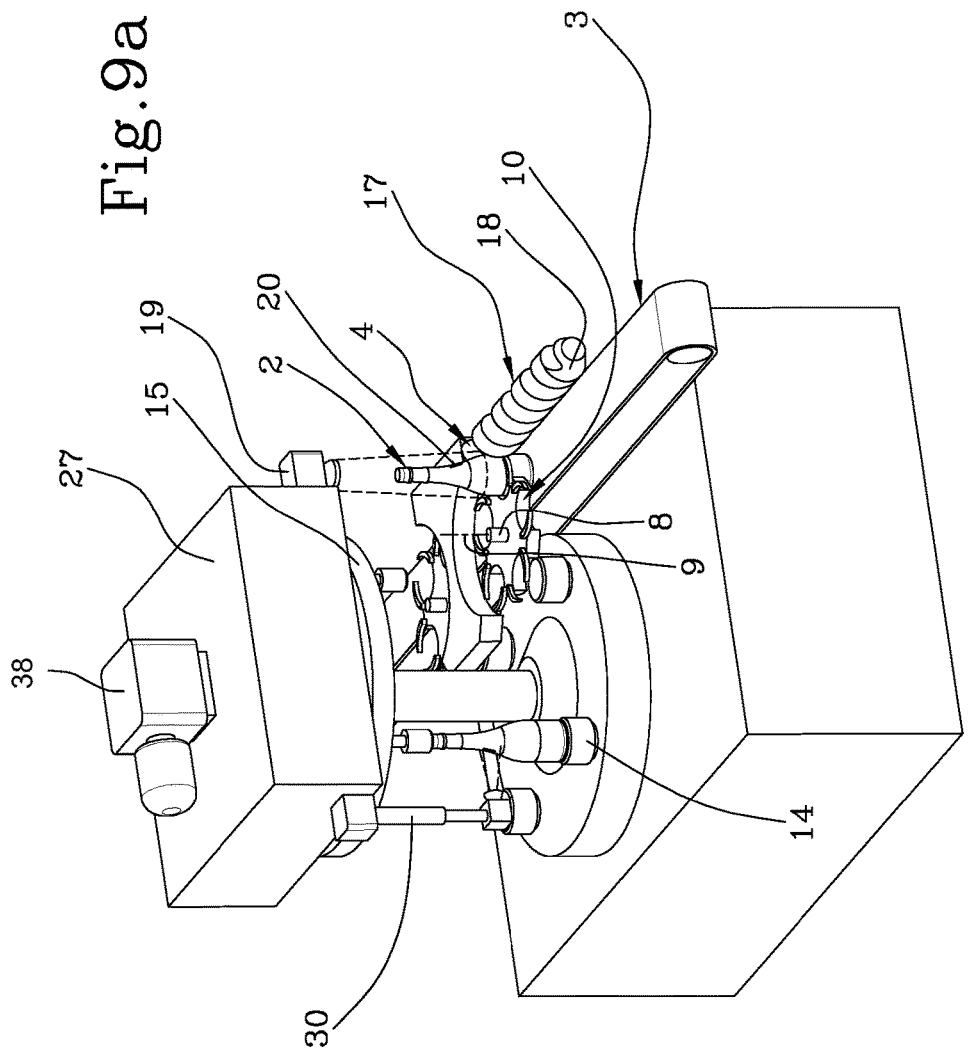

MACHINE AND METHOD FOR ORIENTING CONTAINERS

CROSS-REFERENCE TO RELATED APPLICATIONS

The present invention is a 35 U.S.C. § 371 U.S. National Stage Application corresponding to PCT Application No. PCT/IB2015/058364, filed on Oct. 29, 2015, which claims priority to Italian Patent Application No. VR2014A000292, filed Nov. 27, 2014. The entire content of each of the aforementioned patent applications is incorporated herein by reference.

TECHNICAL FIELD

This invention relates to a machine for moving containers to be processed along a feed path.

BACKGROUND ART

More specifically, the machine according to this invention falls within the sector of processing containers (bottling, labelling, capping, . . . ). These containers may consist of bottles, cans or other containers not expressly indicated.

Usually, a machine for moving containers comprises an infeed conveyor belt for feeding the containers to an infeed station, an infeed transfer starwheel positioned at the infeed station for picking up one container at a time and carrying it to a loading station, and a rotary carrousel at the outer periphery of which there are stations for processing the containers. An example of this structure is described in patent application EP2382146 in the name of the same applicant as this invention.

In detail, the carousel comprises a plurality of rotatable plates, located along the relative periphery, and on which are positioned the containers (a container for each plate) once unloaded from the transfer starwheel.

As already mentioned, in effect, in the container processing field, the containers are loaded on a rotary carousel to which are associated various processing stations, which operate on the containers. These processing stations may be, for example, stations for applying labels, or filling stations, or stations for closing the bottles or the like.

According to first solution of the prior art, a plurality of sensors are mounted on the carousel, each located at a plate. More specifically, again according to the prior art, each sensor detects, during rotation of the container on the relative plate, a distinctive mark on the bottle (commonly know as "spot") which may be, if, for example, it is a glass bottle, the glass seam, a logo prepared on the glass (on which, for example, a label is to be applied), or yet other marks.

Once the sensor has detected the bottle "spot", a control unit connected to the sensor processes the signal and associates it with the corner in which the plate is positioned at that precise moment. In this way the initial orientation of the bottle on the plate is known.

The knowledge of the initial orientation of the container is important because, in that way, it is possible to rotate the plate by a predetermined angle in such a way as to bring a predetermined part of the lateral surface of the bottle on which, for example, to apply a label at the labelling station. Normally, each sensor is connected to the carousel (at a plate) using a bracket and it rotates integrally with the carousel so as to follow each container during rotation of the carousel.

Each bracket is normally connected to an upper part of the carousel and it extends mainly in a vertical direction towards the plates. In other words, the carousel normally has a plurality of vertical rods distributed along the perimeter of the carousel.

However, this first prior art technique has several disadvantage.

More specifically, a first disadvantage is linked to the fact that the presence of a plurality of rods and a plurality of sensors further complicates the structure of the carousel and increases the dimensions of the carousel.

In addition, the presence of a plurality of brackets distributed around the carousel hinders access to the internal components of the carousel, such as when, for example, it is necessary to carry out the maintenance or replacement of components.

Moreover, a further disadvantage is linked to the fact that it is necessary to have as many sensors as there are plates of the carousel. Therefore, in the case of large carousels with many stations, it is necessary to have a large number of detection sensors. Consequently, the presence of many sensors increases the final cost of the carousel due both to the costs of the sensors themselves and the costs of the structures which support them.

In a second prior art technique described in patent documents EP2658783 and DE1805010 the carousel comprises a single sensor movable along the outer perimeter of the carousel over a predetermined arc to detect the orientation of each container and then return to the starting position in order to detect the orientation of the new container and so on . . . . The sensor is connected to the carousel through an arm which protrudes outside of it up to the height of the container.

However, this second known technology has certain disadvantages.

More specifically, in this case it is necessary to wait for the container to carry out a complete rotation about itself in such a way as to detect the spot for identifying the respective orientation. During the rotation of the container (and therefore of the plate) the carousel rotates and therefore a part of the angle of rotation of the carousel is lost for detecting the orientation of the container. Consequently, it is necessary to dimension the radius of the carousel both as a function of the number of work stations to be connected to it, and as a function of the space necessary for the initial detection of the orientation of the container.

In addition, a dedicated structure is necessary for moving the arm which supports the sensor along the predetermined angle. This movement of the arm must also be synchronised with the movement of the carousel in such a way that the sensor can follow a corresponding container.

Lastly, since above each plate there is a cap-pressing head to hold the container stationary in position, the known detection systems do not allow a "spot" located on the cap of a bottle or on the top surface of the container to be detected since it is masked by the cap-pressing head.

In a third prior art technique illustrated in patent document WO/03024808 there is a detector positioned upstream of the carousel and configured for detecting a text present on the cap of the container before the latter is transferred on the carrousel. Following the transfer of the container into the carousel, the plate is rotated by a predetermined angle already calculated as a function the position of the text detected on the cap in order to apply the label.

However, this prior art technique has several of disadvantages due to the fact that the text present on the cap is never correlated with the area of the lateral surface on which the label is to be applied. For this reason, it is not possible to have control over the position for application of the label. In addition, by using this prior art technique it is possible to operate only with containers which have a cap (sometimes the capping step occurs subsequently) and having a text (not all the caps have a text). In this situation, the aim of this invention is to provide a machine for moving containers which overcomes the above-mentioned disadvantages.

DISCLOSURE OF THE INVENTION

More specifically, the aim of this invention to provide a machine for moving containers which reduces the dimensions for supporting the sensor along the edge of the carousel.

Another aim of this invention to provide a machine for moving containers which allows the timing and the spaces for detecting orientation of the container to be optimised.

Lastly, the aim of this invention to provide a machine for moving containers which allows the containers to be oriented according to a "spot" present on their lateral surface.

The aims indicated are substantially achieved by a machine for moving containers as described in the appended claims.

BRIEF DESCRIPTION OF DRAWINGS

Further characteristic features and advantages of this invention will emerge more clearly from the detailed description of several preferred, but not exclusive embodiments of a machine for moving containers illustrated in the accompanying drawings, in which:

FIG. 1a shows an axonometric side view of a machine for moving cans of FIG. 1;

FIG. 2 shows an axonometric close-up side view of the machine of FIG. 1 with some parts cut away in order to better illustrate others;

FIGS. 9, 9a and 10 to 16 show views corresponding to FIGS. 1, 1a and 2 to 8 wherein the machine according to this invention is applied to a bottle;

DETAILED DESCRIPTION OF PREFERRED EMBODIMENTS OF THE INVENTION

Figure 3:
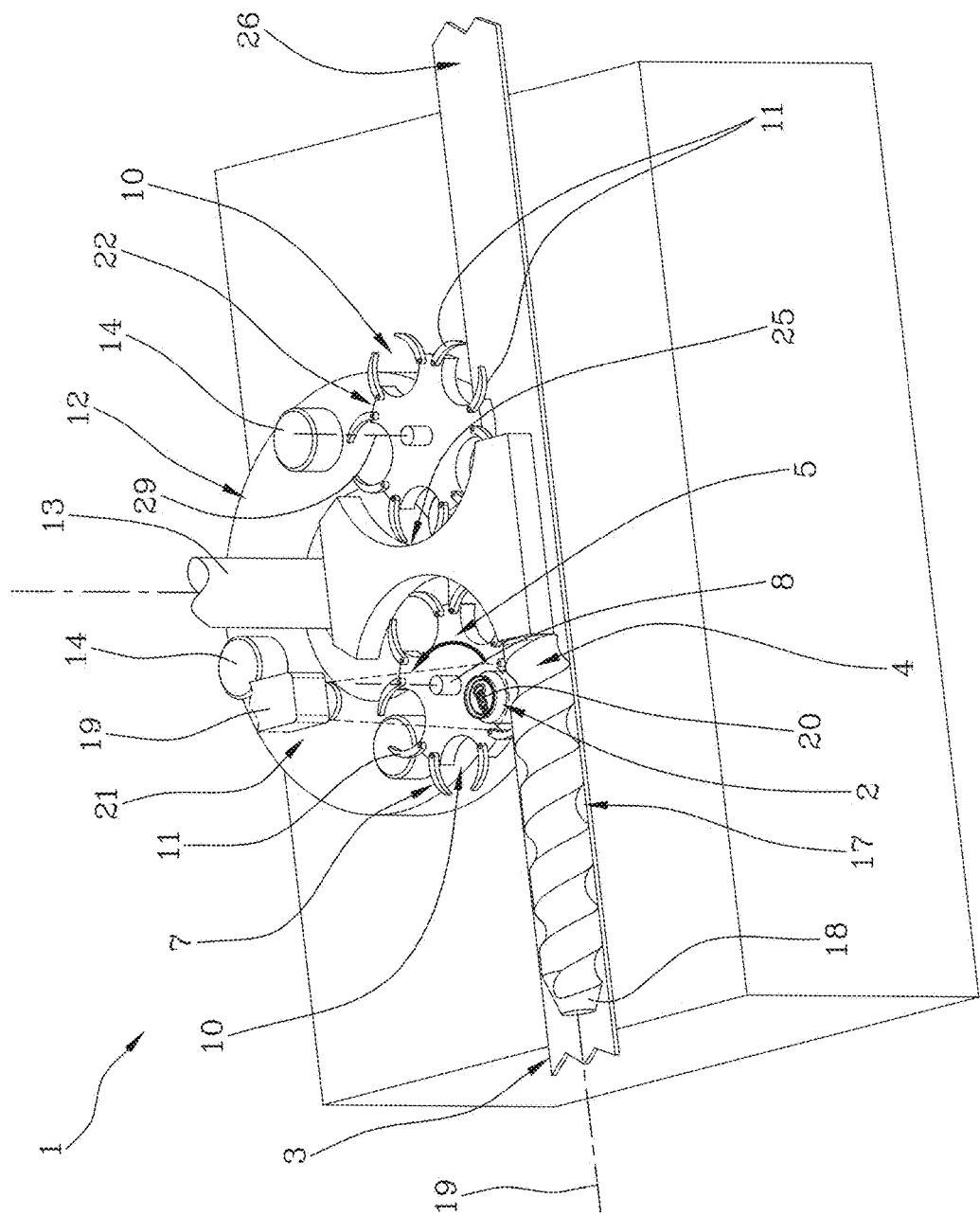
FIG. 3 shows an axonometric close-up side view of the machine of FIG. 2 in a first operating position.

With reference to the said figures, the numeral 1 denotes in its entirety a machine for moving containers 2 according to this invention.

As already mentioned, the containers 2 in question may comprise bottles (FIGS. 1 to 8), cans (FIGS. 9 to 16) or other containers not expressly indicated.

More specifically, the machine 1 moves the containers 2 according to a predetermined feed path which will be described in more detail below.

The machine 1 comprises infeed means (3) for feeding the containers 2 to an infeed station 4. In that way, the infeed means 3 carry each container 2 to the infeed station 4. It should be noted that each container 2 is preferably positioned "standing up" on the infeed means 3. These infeed means 3 preferably comprise a conveyor belt (see accompanying drawings).

Moreover, the machine 1 comprises an infeed transfer unit 5 located at the infeed station 4 and configured to take the containers 2 in one at a time and carry them to a loading station 6 along the feed path.

The movement of the transfer unit 5 is synchronised with the infeed means 3 so that when a container 2 reaches the infeed station 4 it is collected by the transfer unit 5 and moved to the loading station 6.

The transfer unit 5 comprises retaining means 7 for keeping the position of the containers 2 relative to the transfer unit 5 itself so the orientation of each container 2 referred to its own main axis of extension is maintained as it is carried from the infeed station 4 to the loading station 6. In other words, the retaining means 7 are configured to maintain the orientation of the container 2 relative to its main axis of extension 28 (usually vertical) in such a way that the container 2 does not rotate about itself during this transfer.

The transfer unit 5 preferably comprises a transfer starwheel, but it could be also defined by a robotized and movable arm for picking up the container 2 from the infeed station 4 and carrying it to the loading station 6.

In the preferred case illustrated in the accompanying drawings, the transfer unit comprises the transfer starwheel which is mounted on a relative supporting shaft 8 and is rotatable about the axis of rotation 9 defined by it. Moreover, the starwheel is operatively associated and synchronised with the infeed means 3. Usually, the star wheel is defined by at least one disc centred on the axis of rotation; if there is more than one disc, these are positioned vertically along the axis of rotation and spaced at a predetermined distance.

Moreover, the star wheel is provided along its periphery with a plurality of housings 10, which are partly open, evenly distributed and designed to each house a single container 2. Each housing 10 is preferably formed on the body of the disc or, alternatively, it may be defined outside the disc by protruding parts (for example defined by the retaining means 7).

Preferably, each housing 10 is positioned at a lower part of the container 2 in such a way as to leave free most of the side wall (so that the transfer unit 5 does not overlap the side wall) of the container 2 according to its main axis of extension 28 from the lower part up to the top of the container 2.

At the same time, the feeding speed of the infeed means 3 is synchronised with the speed of rotation of the infeed transfer starwheel in such a way that the difference between the feed speed of a container 2 along the infeed means 3 and the tangential speed of the relative starwheel at the infeed station 4 is practically zero. In this way, differences in speed are avoided which could result in damage to some containers 2.

In the accompanying drawings, the retaining means 7 comprise a plurality of grippers each associated with a respective housing 10 and each having two portions 11 movable towards and away from each other in such a way as to define the locking of the container 2 (when the movable portions 11 are close together) or the releasing of the container (when the movable portions 11 are spaced apart). More specifically, the movable portions 11 of the gripper are positioned at the side walls of a container 2 to be held.

In the preferred embodiment illustrated in the accompanying drawings, the movable portions 11 of each gripper are positioned at least partly inside the respective housing 10 and move along a horizontal plane for blocking or releasing the container 2.

It should be noted that the retaining means 7 comprise relative means (not illustrated in the accompanying drawings) for movement of the grippers configured for moving the gripping portions in synchrony with the movement of the infeed means 3.

More in detail, the means for moving the retaining means 7 are configured to close the grippers at the infeed station 4 following the insertion of a container 2 in a relative housing 10, and to open the grippers at the loading station 6 to release the container 2.

The means for moving the retaining means 7 may comprise a system for transmitting the movement (for example, a cam system) operatively connected to the rotation of the starwheel on itself.

In an alternative embodiment not illustrated in the accompanying drawings, the retaining means 7 comprise of the inserts made of gripping material (for example, rubber) inserted in each housing 10 and designed to enter into contact with the respective container 2 to hold it.

In this specific case, infeed transfer starwheel comprises the housings 10 into which the gripping material inserts are positioned. The inserts made of gripping material are preferably positioned at an inner side wall of the housing 10. In an example the alternative embodiment, the transfer starwheel might be made of plastic material which is best suited to the construction of the gripping material inserts.

The movement of the container 2 from the infeed station 4 to the loading station 6 defines a part of the feed path.

Moreover, the machine 1 comprises a carousel 12 rotatable about a respective rotation shaft 13 and comprising a plurality of rotatable supports 14 positioned along the periphery of the carousel 12 for supporting the respective containers 2 once loaded on it.

The carousel 12 extends at the loading station 6 and is synchronized in movement with the infeed transfer unit 5 in such a way that each container 2 unloaded by the unit is placed on a respective support 14 of the carousel 12.

Preferably, the rotation of infeed transfer starwheel is synchronised with the rotation of the carousel 12 in such a way that each housing 10 of the starwheel is located at a respective support 14 of the carousel 12 in the loading station 6.

Moreover, the speed of the starwheel is controlled in such a way that the tangential speed of the housings 10 is equal to the tangential speed of the carousel 12. Each carousel is also positioned substantially tangential to the infeed means 3 in such a way that a product carried by them can enter or leave a housing 10.

Therefore, in use, the time necessary to travel along the arc between two consecutive supports 14 of the carousel 12 must be equal to the time necessary to travel along the arc between two consecutive housings 10 of the infeed transfer starwheel.

In the preferred embodiment, the infeed transfer starwheel is partly superposed on a peripheral part of the carousel 12 in such a way that each container 2 transported by the starwheel is unloaded on a support 14.

More specifically, the infeed transfer starwheel is interposed between the carousel 12 and the infeed station 4.

Moreover, it should be noted that the machine 1 comprises means for moving each support 14 (not illustrated in the accompanying drawings) configured to make the latter rotate on itself through an angle of rotation during the movement of the carousel 12 following the loading of the container 2 on it.

In addition, the carousel 12 comprises an upper portion 15 also rotating together with the supports 14 and spaced vertically from them at which there are a plurality of units 16 for holding the containers 2 (commonly defined as cap-pressing heads 31). Each holding unit 16 is movable from a raised position to a lowered position relative to the container 2. At the lowered position the holding element 16 comes into contact with the top of the container 2 and holds it pressed against the support 14 following the loading of the container 2 on the latter. In this way, the container 2 is prevented from moving (or possibly falling) from the support 14 and it is possible to operate on the container 2 (for example, for applying a label).

The machine 1 also comprises spacing means 17 which are operatively coupled to the infeed means 3 in such a way that the containers 2 arrive at the infeed station 4 spaced apart from each other. In the embodiment illustrated in the accompanying drawings, the spacing means 17 are coupled to a part of the infeed means 3 close to the infeed station 4.

In the preferred embodiment illustrated in the accompanying drawings, the spacing means 17 comprise a screw feeder 18 rotatable about a respective axis of rotation 19 substantially parallel to the feed path and transversal. The screw feeder 18 comprises a helical channel having a relative pitch and a channel width and depth.

In some embodiments, the screw feeder 18 has a helical channel with a shape such that it can operate on containers 2 belonging to various types and therefore having different dimensions and shapes. More specifically, the width of channel decreases from the outer surface towards the inside in such a way that any type of container 2 which falls within a certain range of predetermined dimensions comes into contact with the screw feeder 18 entering to a greater extent (in the case of a smaller container 2) or a lesser extent (in the case of a larger container 2) in the helical channel.

In addition, the machine 1 comprises motor-driven means 38 associated with the carousel 12 to rotate it around its own rotation shaft. The motor-driven means 38 can also be associated with the infeed transfer starwheel to rotate it about itself using a suitable drive mechanism. Alternatively, the infeed transfer starwheel might be motor-driven in an automatic manner for its relative rotation on itself.

According to this invention, the machine 1 comprises a detector 19 configured to detect an initial orientation of each container 2 relative to the central axis of extension thereof at a position where the container 2 is upstream of the loading station 6 in the carousel 12 along the feed path.

More specifically, the detector 19 is positioned between the infeed station 4 and the loading station 6. In a first embodiment illustrated in the accompanying drawings, the detector 19 is positioned at the infeed station 4. In other words, the detector 19 is positioned between the infeed transfer starwheel and the infeed means 3.

In a second embodiment not illustrated in the accompanying drawings, the detector 19 is positioned at an intermediate station between the infeed station 4 and the loading station 6. In other words, the detector 19 is positioned at the part of the feed path of the container 2 in which the container 2 is inserted in a housing 10 of the transfer unit 5. Even more in detail, the detector 19 is positioned at the feed path arc defined by the infeed transfer starwheel.

In that way, in effect, since each housing 10 is positioned at a lower part of the container 2 as previously defined, most of the side wall of the starwheel is left free in such a way that the detector is also be able to detect most of the side wall.

It should be noted that the detector 19 is fixed in position relative to movement of the containers 2 along the feed path. By way of example, in the accompanying drawings the detector 19 is connected to a fixed frame 27 of the carousel 12 (not rotary). However, in other embodiments not illustrated in the accompanying drawings, the detector 19 might be supported by a relative dedicated frame or frames supporting other components of the machine 1.

Moreover, the detector 19 is configured for measuring a "spot 20" of the container 2 by detecting an image and a subsequent electronic processing of the latter (preferably by software of known type).

More specifically, the machine 1 comprises a control unit operatively connected to the detector 19 and to the means for moving each support 14 of the carousel 12 and configured to:
receive the information contained in the image detected by the detector 19;
processing the image captured by the detector 19 scanning the peripheral area around the top or mouth or cap 31 of the container 2 present in the image and corresponding to the lateral surface of the container 2. In that way, it is possible to determine the initial orientation of the container 2 as a function of a "spot" 20 located on the lateral surface;
calculating the angle of rotation of the support 14 in order to orient the container 2 loaded thereon to a predetermined final orientation (for example, the one suitable for applying a label on a predetermined side wall of the container 2) as a function of the initial orientation detected and of the movement imparted by the transfer unit;
drive the movement means so as to rotate the support 14 by the calculated angle of rotation after the container 2 has been placed on the support 14 so as to turn the container 2 to the predetermined final orientation.

Figure 18:
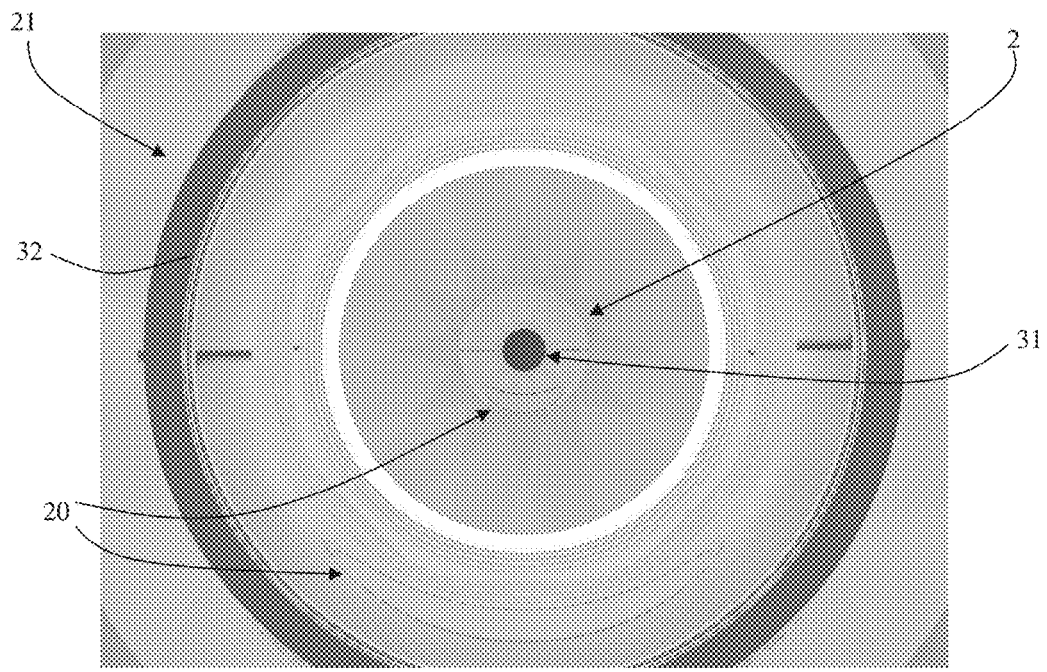
FIG. 18 shows a schematic top view of the image from above detected by the detector of the container of FIG. 17.

More in detail, the control unit is programmed to scan the image of the container 2 detected from above eliminating the central zone of the image corresponding to the top/mouth/cap 31 of the container 2 so that it analyses the circular crown which is around the central zone and which corresponds to the lateral surface of the container 2 (see FIG. 18 wherein the zone of the image corresponding to the cap 31 is obscured).

It should be noted that the detector 19 is synchronised with the infeed means 3 and with the infeed transfer starwheel so as to perform the detecting of the container 2 when the latter reaches a detection zone. The detecting zone extends from the infeed station 4 to the loading station 6.

The detection of the initial orientation of the container 2 consists in a recognition of a "spot 20" of the container 2 on the basis of which the control unit calculates (by electronic processing of the image) the initial orientation of the container 2.

Figure 4:
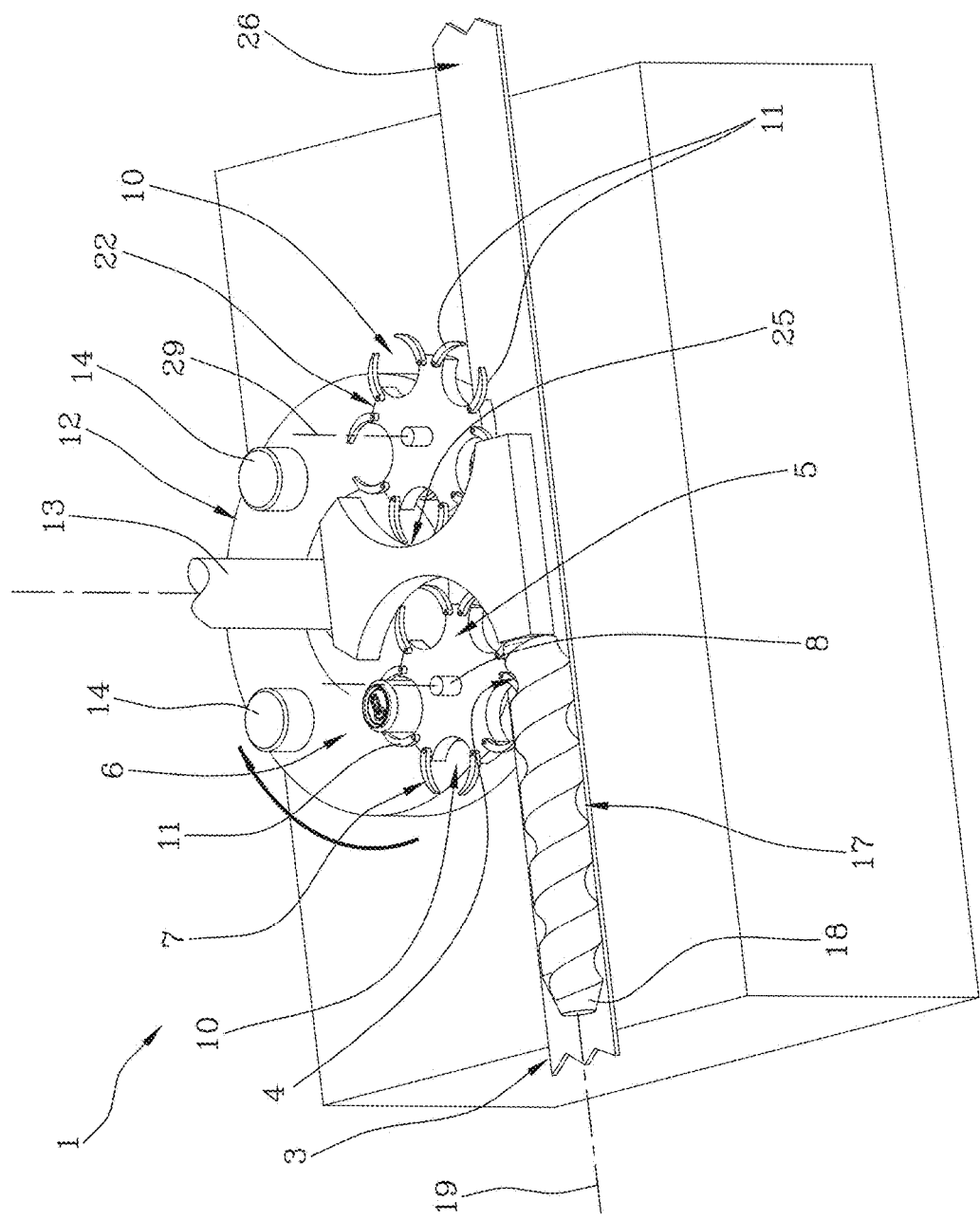
FIG. 4 shows an axonometric close-up side view of the machine of FIG. 2 in a second operating position.
Figure 5:
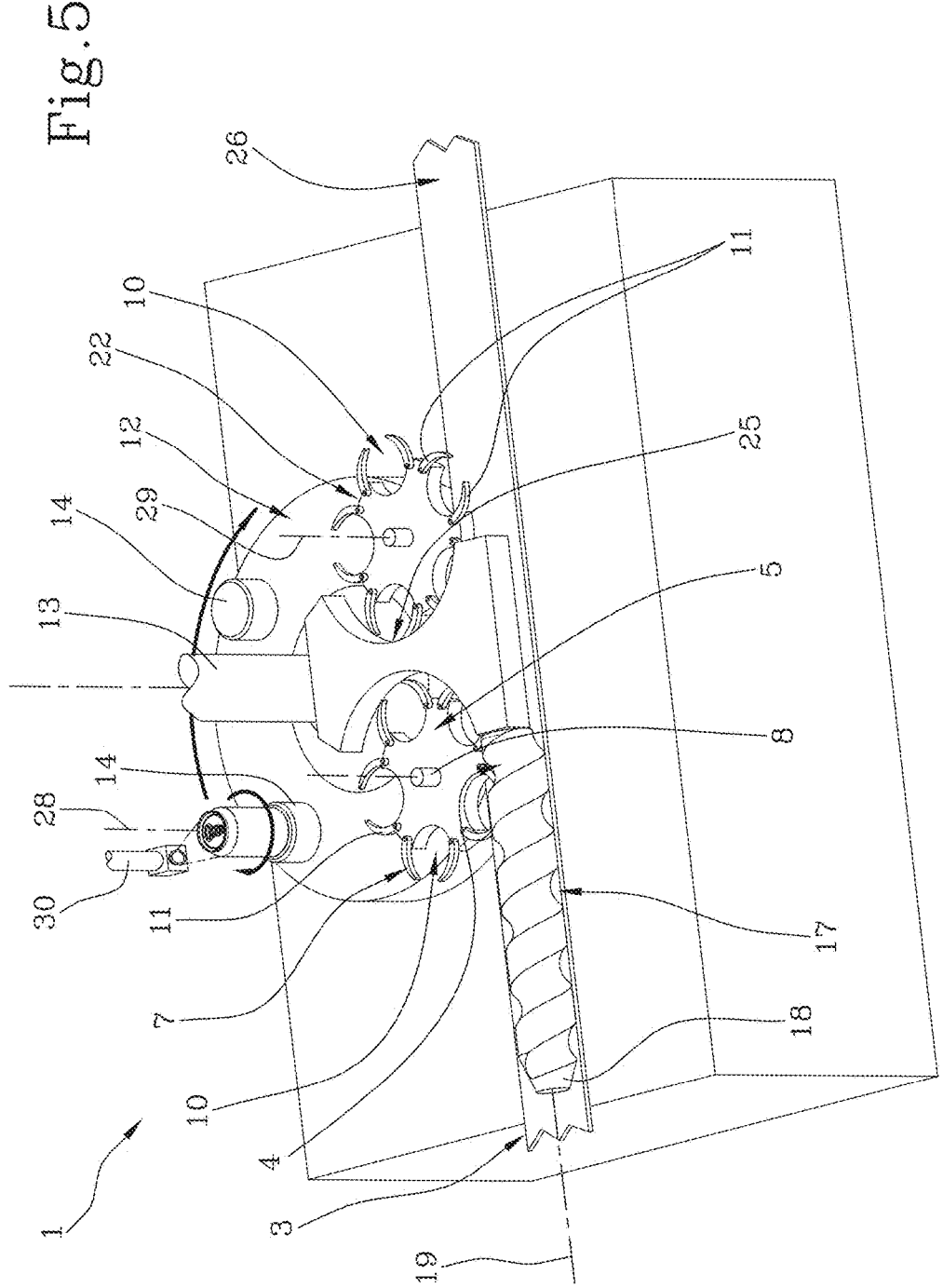
FIG. 5 shows an axonometric close-up side view of the machine of FIG. 2 in a third operating position.
Figure 6:
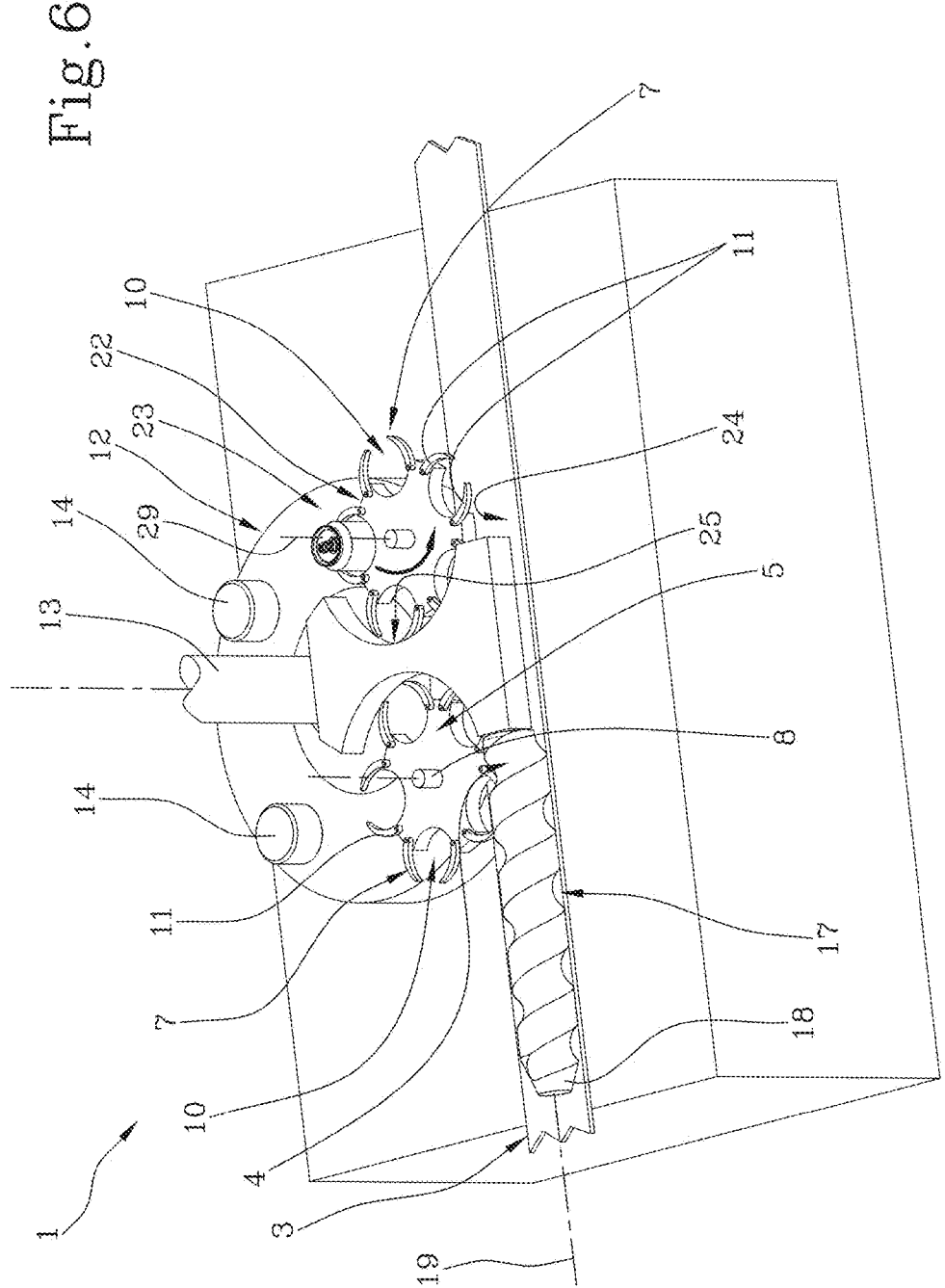
FIG. 6 shows an axonometric close-up side view of the machine of FIG. 2 in a fourth operating position.
Figure 7:
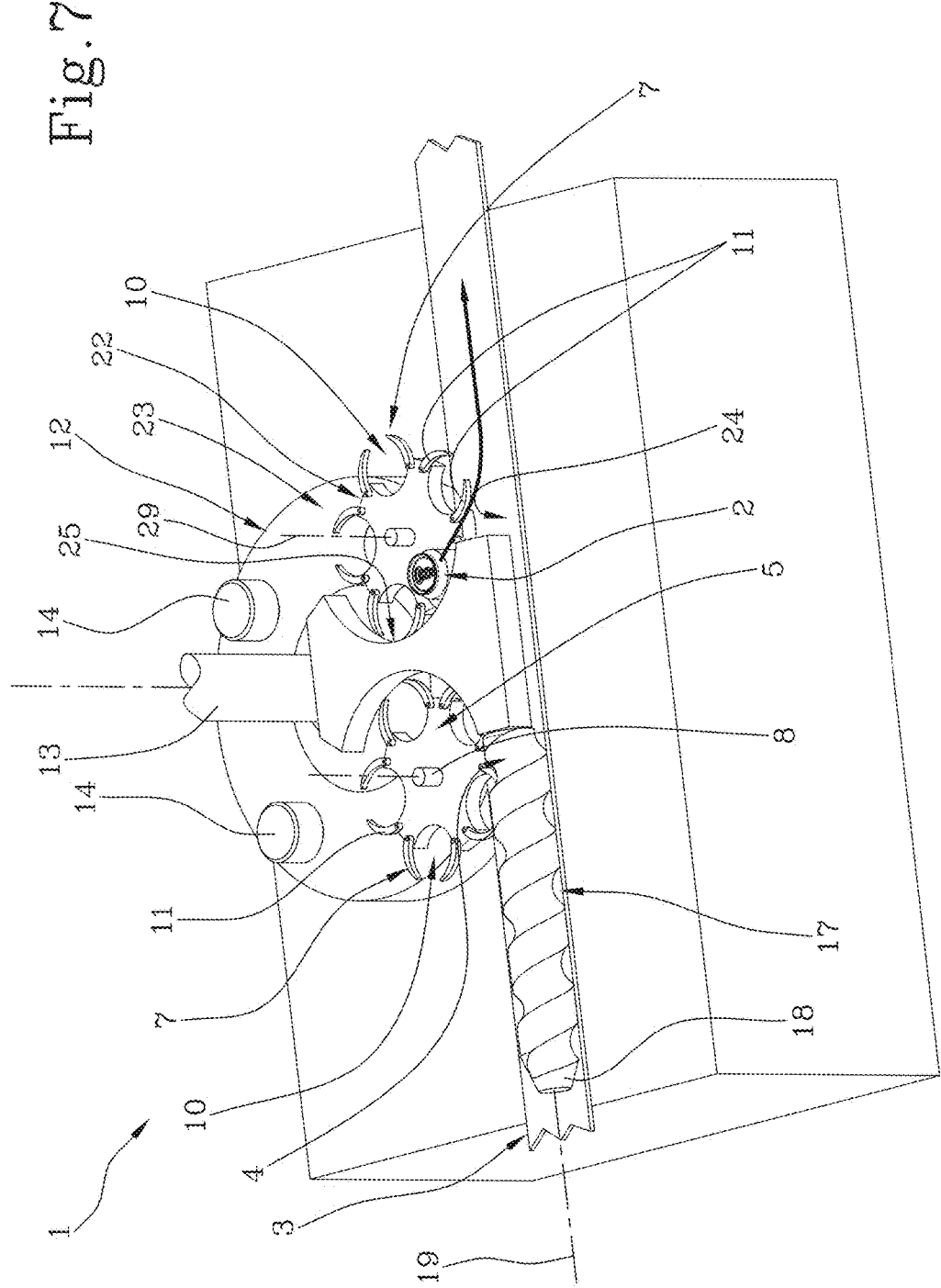
FIG. 7 shows an axonometric close-up side view of the machine of FIG. 2 in a fifth operating position.
Figure 8:
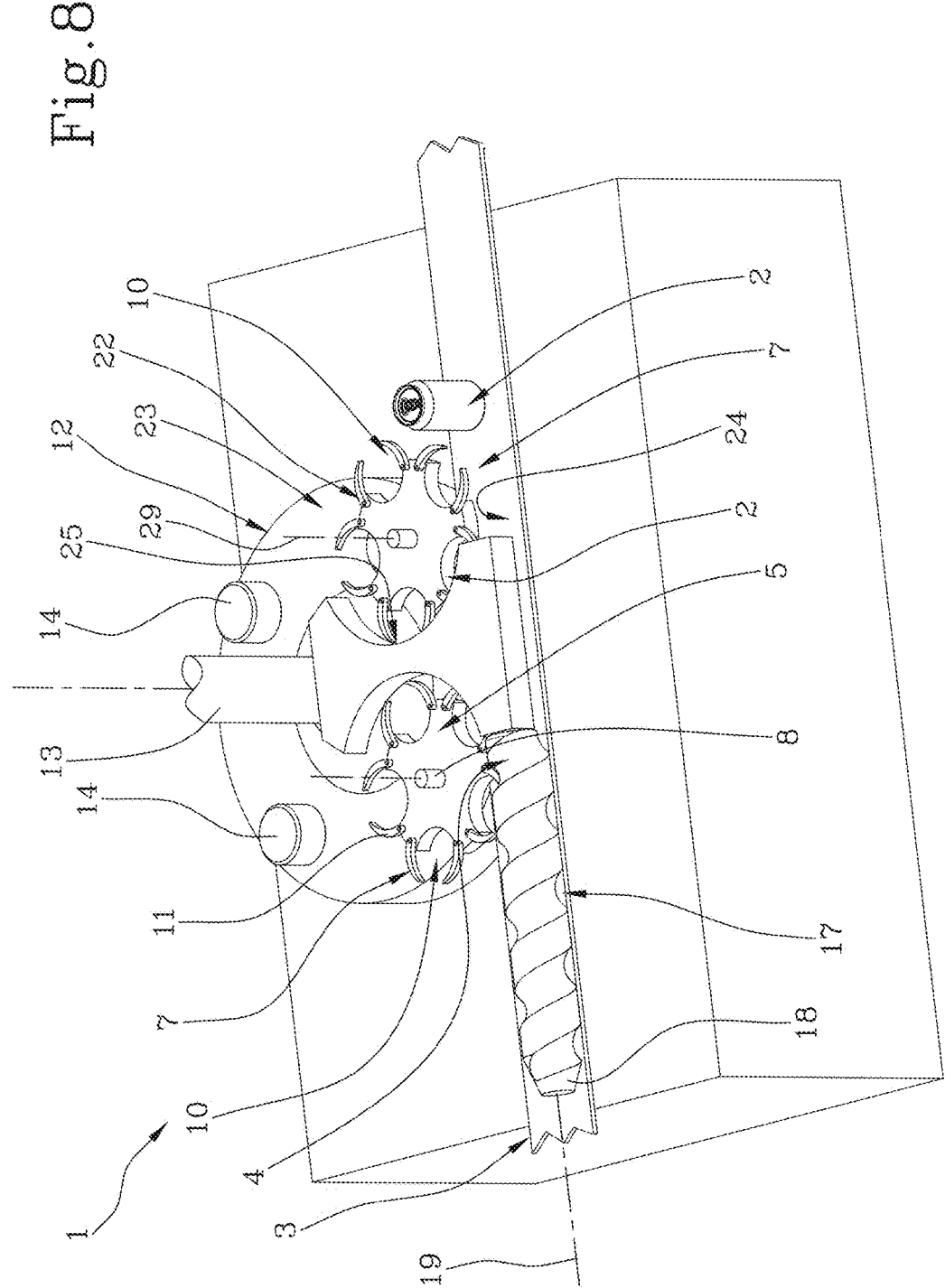
FIG. 8 shows an axonometric close-up side view of the machine of FIG. 2 in a sixth operating position.
Figure 9:
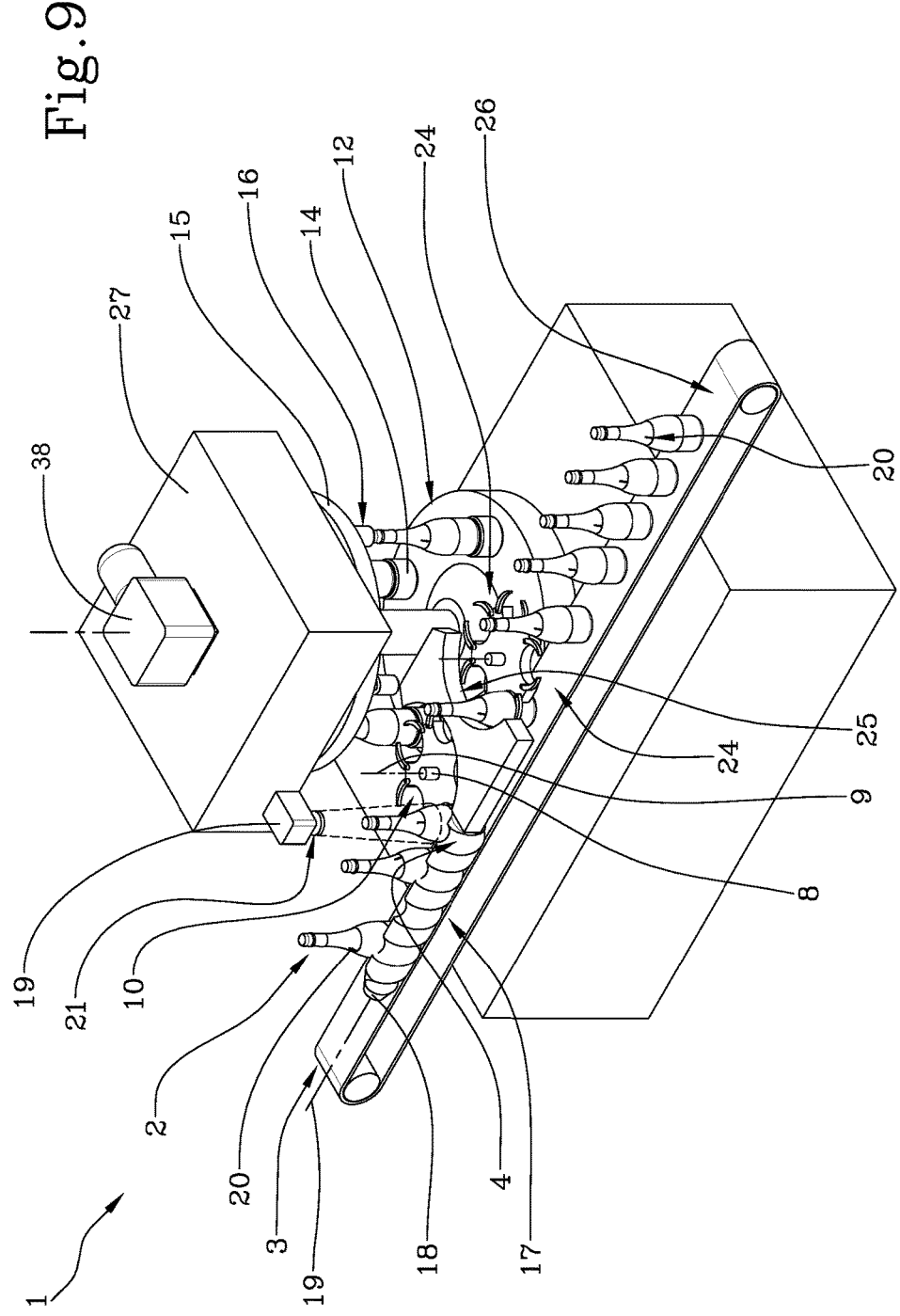

More specifically, in the preferred case wherein the transfer unit is the transfer starwheel, the control unit is configured to calculate the angle of rotation of the support 14 as a function of the rotation performed by the starwheel for carrying the container 2 from a detection zone (wherein the detector 19 detects the initial orientation of the container 2) to the loading station 6. For example, FIGS. 3 and 4 show that the container 2 has undergone a rotation of approximately 180° around the axis of rotation of the transfer starwheel. In that case, the control unit will take into consideration that from the infeed station 4 (where the detection preferably occurs) to the loading station 6, the container 2 has undergone a rotation of approximately 180°.

As already mentioned, the control unit is configured to detect orientation of the container 2 by analysing the image detected in which it is possible to identify a recognition mark of the container 2 or a predetermined "spot 20". FIGS. 1 to 8 show, for example, the recognition mark, defined as a tab of the can, whilst FIGS. 9 to 16 show the recognition mark as a "spot 20" made on the neck of the bottle. In any case, the identification mark could be a "spot" made on the lateral surface of the container 2. In effect, the detector 19 is configured for detecting from above also the lateral surface of the container (according to a perspective view from above) which is then analysed.

Preferably, the detector 19 is an image detector 19, preferably a still camera or a video camera.

It should also be noted that the detector 19 is positioned outside the outer horizontal edge of the carousel 12 in such a way as to eliminate protrusions, along the perimeter of the carousel 12, linked to the supporting structure 14 of the one or more detectors (as described in prior art).

In the preferred embodiment, the detector 19 is positioned above the containers 2 and is configured to detect the orientation of the container 2 from the top down. In other words, the detector 19 is positioned above the infeed means 3 and the transfer unit 5 and is spaced from the latter by a predetermined distance which is greater than the height of the containers 2 to be processed. In other words, the detector 19 again faces the top of the container 2 and is configured to perform a detection from above.

In addition, the detector 19 may detect an image of a top surface of the container 2 (for example, cap 31 or tab of the can); this operation not being possible in the carousel 12 due to the presence of the units 16 for holding the containers 2 which cover the top surface.

Consequently, this invention makes it possible to detect a "spot 20" of a container 2 positioned at its top or lateral surface (for example the tab of the can).

In any case, the detector 19 is preferably configured to receive rays for detecting (light rays reflected by the container 2) the framed image of the container 2. In this way, the detector 19 detects the image of the framed part of the container 2.

In detail, since the detector 19 is configured to perform a detection from above, the rays for detecting propagate along a path substantially parallel to the main axis of extension of the container 2. In order to improve the detecting of the lateral surface of the container 2, the detector 19 preferably comprises a deflection system 21 for deflecting the rays of the framed image configured to detect an image also of the side walls of the framed container 2.

In other words, the system 21 for deflection from above is configured for deflecting the rays coming from the lateral surfaces of the container 2.

The deflection system 21 is preferably interposed between a snap-on shutter of the image of the detector 19 and an underlying container 2.

Preferably, the deflection system 21 comprises a telecentric lens and/or one or more Fresnel lenses and/or one or more hypercentric lenses and/or a system of hypercentric lenses and/or a cylinder 32 having a reflecting inside lateral surface. Advantageously, in this way it is possible to improve the detection of the lateral surfaces (the "spot 20" is present on them).

As regards the last alternative mentioned above (cylinder 32 with lateral inner surface having a mirror finish), FIG. 18 shows an example of the image of the lateral surface of a container 2 reflected from the mirror as it is detected from above by the detector 19. More specifically, in the image the "spot" 20 is represented by the text in relief (spot 20) beneath which the label will be applied.

In addition, again in FIG. 18, it is possible to see that the central image represents the direct image of the container 2 (not reflected) in which it is possible to see the text in relief (spot 20) beneath which the label will be applied.

More specifically, the control unit is configured to rotate the support 14 of the carousel 12 on which the detected container 2 is loaded by the angle calculated during the movement of the carousel 12 in such a way that in the first stretch of movement of the carousel 12 starting from loading station 6, the container 2 is oriented directly in the final orientation without carrying out any complete revolutions on itself for the detection of the entire lateral surface.

In addition, as can be seen in FIGS. 1a, 5, 9a and 13, the machine 1 comprises a further detector 30 positioned along the perimeter of the carousel and downstream of the loading station 6. More specifically, the further detector 30 is configured to detect an image of the container 2 once the latter has rotated about itself by the angle calculated by the support 14. In other words, the further detector 30 is configured for detecting the final orientation of the container 2 in such a way as to check for any deviations to the final orientation of the container 2 relative to a final pre-calculated theoretical orientation (for example in order obtain a correct labelling).

For this reason, the control unit is connected to the further detector 30 and is configured for:
receiving the information relative to the final orientation of the container 2 from the further detector 30;
processing the detection information and calculate the angular deviation of the container 2 between the final orientation and the theoretical final orientation;
driving the movement means so as to rotate the support 14 by an angle corresponding to the calculated angular deviation in such a way as to turn the container 2 to the theoretical final orientation.

Preferably, the further detector 30 is physically located in a position spaced from the loading station 6 along the periphery of the carousel 12.

Preferably, the further detector 30 is a detector of images (stills camera) and/or videos (video camera) of known type.

It should also be noted that the machine 1 also comprises an outfeed transfer unit 22 synchronized in movement with the carousel 12 and configured to remove the containers 2 one at a time from the supports 14 of the carousel 12 at an unloading station 23 spaced from the loading station 6 along the feed path. The outfeed transfer unit 22 is configured to carry each container 2 picked up to an outfeed station 24.

Preferably, the infeed transfer unit 22 comprises an infeed transfer starwheel rotatable about a respective axis of rotation 29. The outfeed transfer starwheel comprises a plurality of housings 10, in which each container 2 is inserted during the transfer from the unloading station 23 to the outfeed station 24.

In a first embodiment, each housing 10 comprises retaining means 7 in a position similar to those defined for the infeed transfer starwheel.

In a second embodiment, the means 7 for holding in position are not present, but there is a semi-circular contact panel 25 located along a peripheral stretch of the transfer starwheel from the unloading station 23 to the outfeed station 24 to prevent the containers 2 from escaping from the respective housings 10.

Moreover, the machine 1 comprises outfeed means 26 extending away from the outfeed station 24 and configured to carry each container 2 away from the carousel 12. Preferably, the outfeed means 26 comprise a conveyor belt and, even more preferably, the conveyor belt is a part of the conveyor belt of the infeed means 3.

This invention also relates to a method for moving the containers 2 to be processed along the feed path. The method is derived directly from what described above relative to the machine 1 for moving containers 2 which is incorporated here in its entirety.

Figure 10:
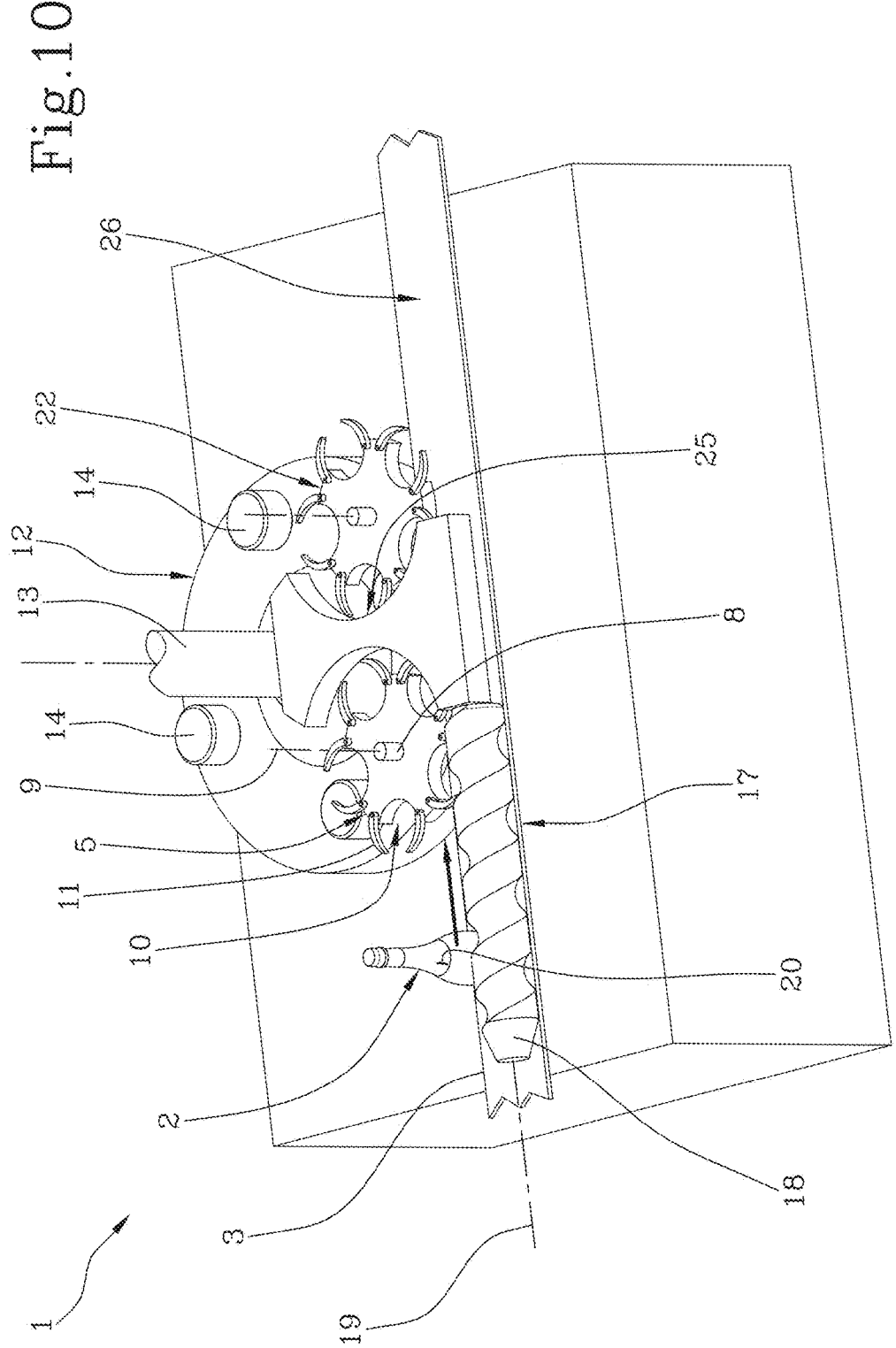
Figure 11:
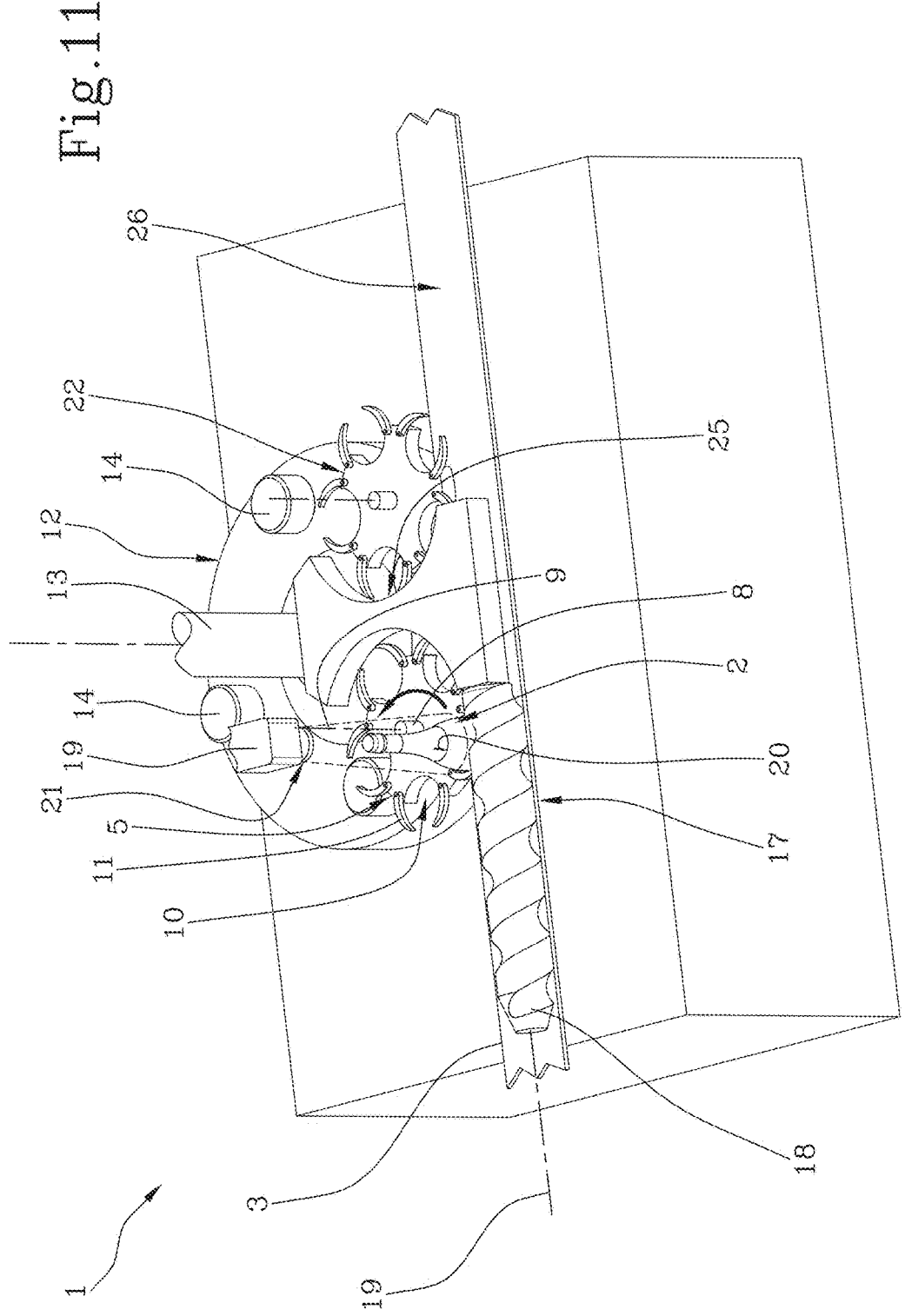
Figure 12:
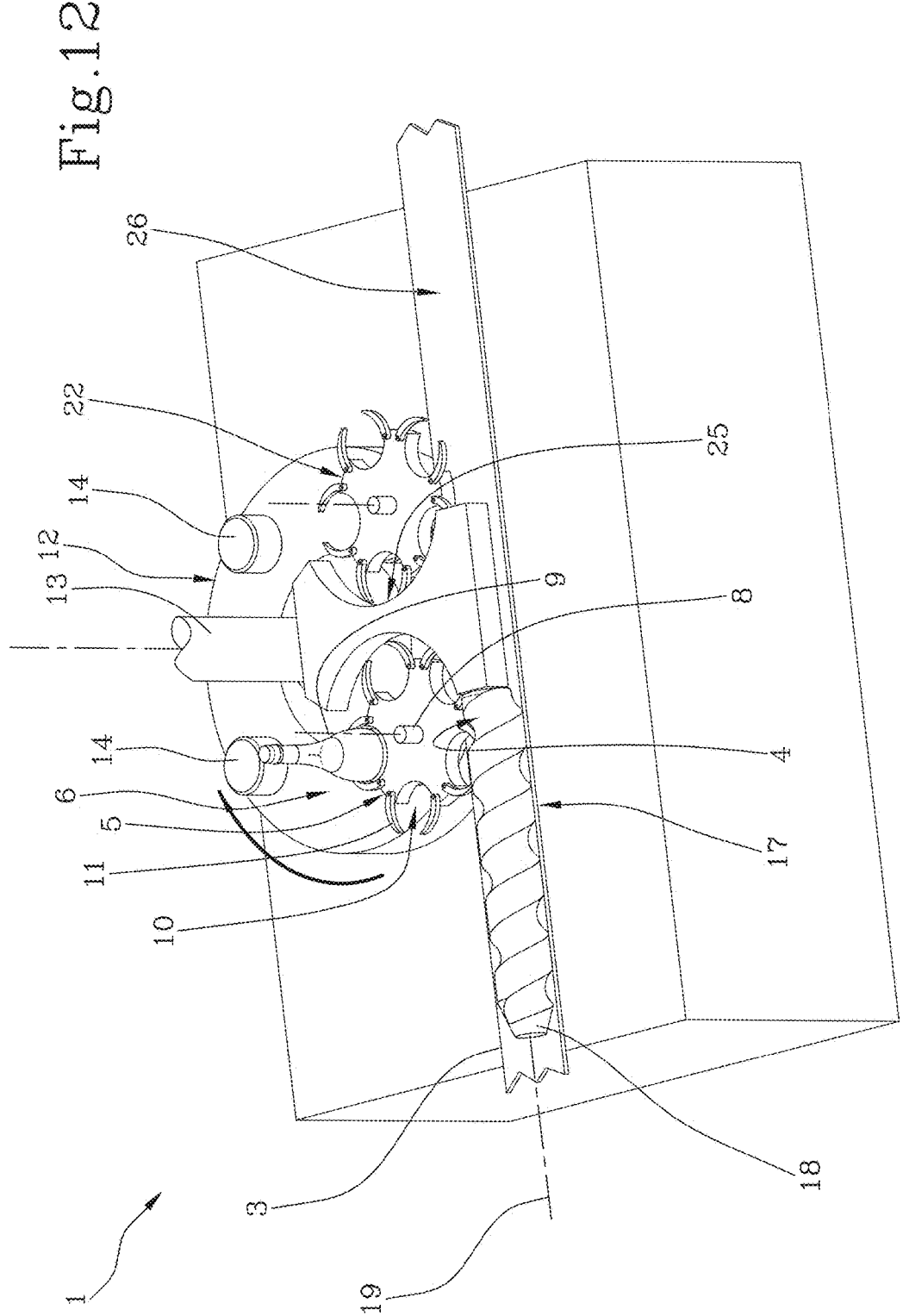
Figure 13:
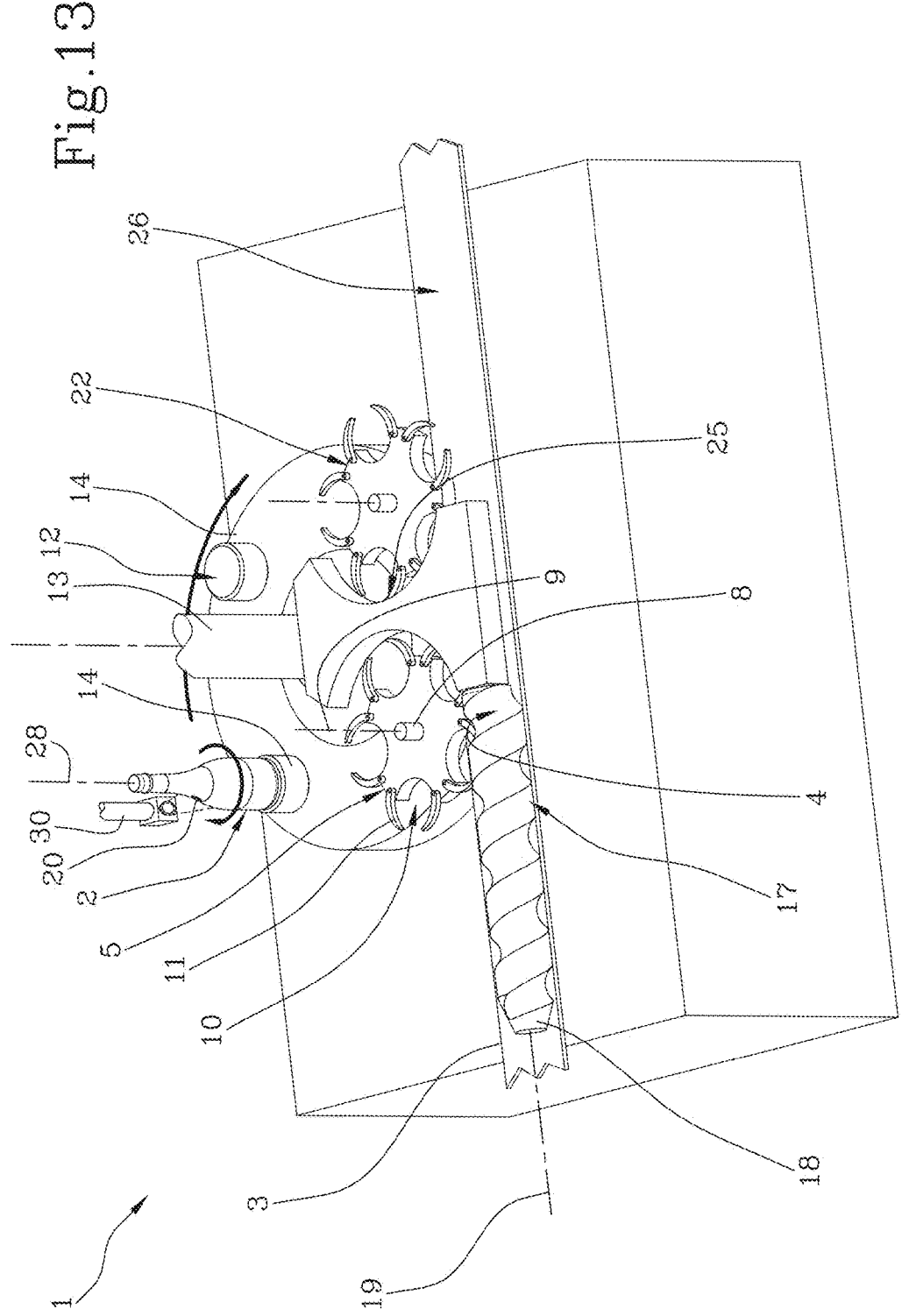
Figure 14:
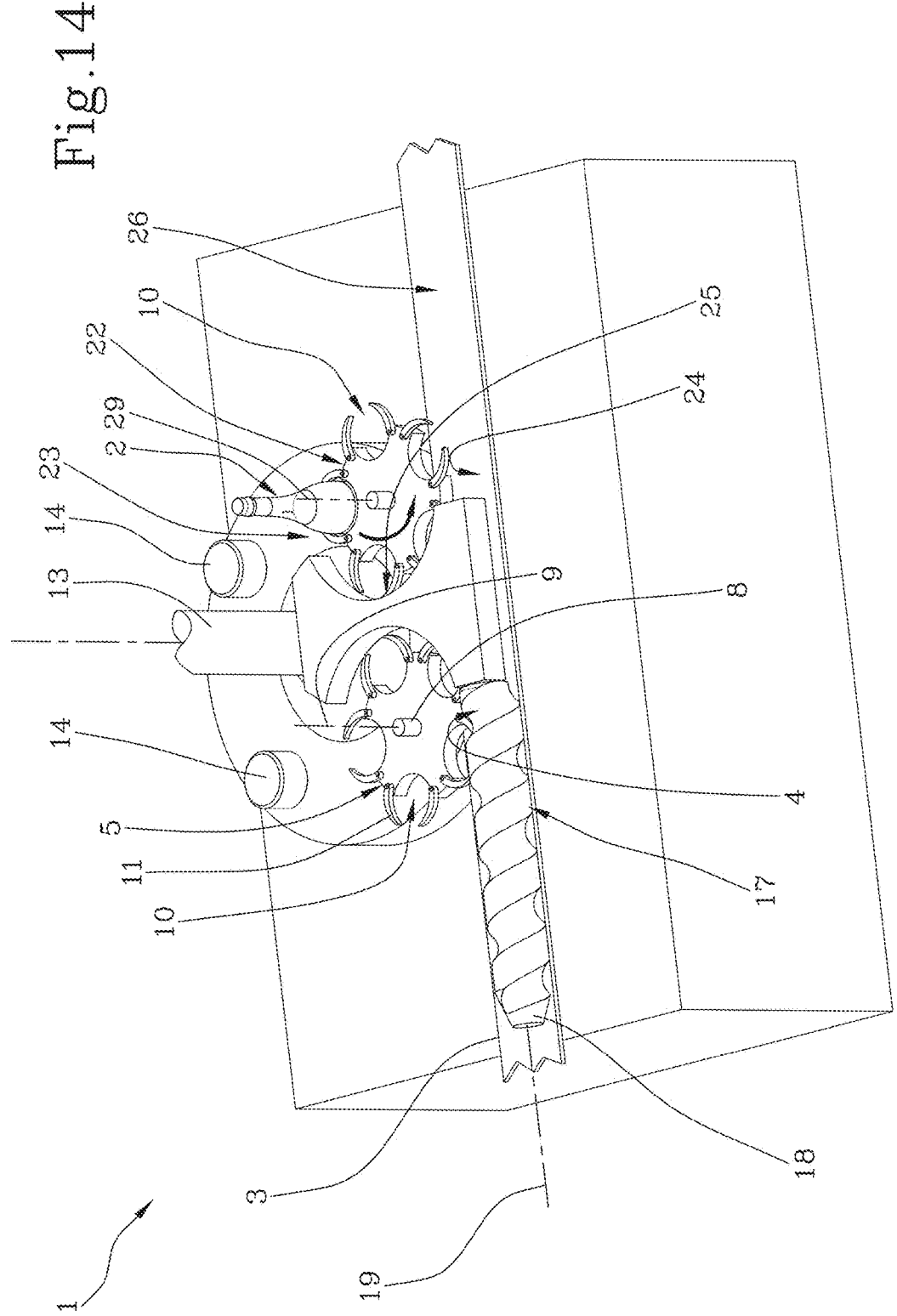
Figure 15:
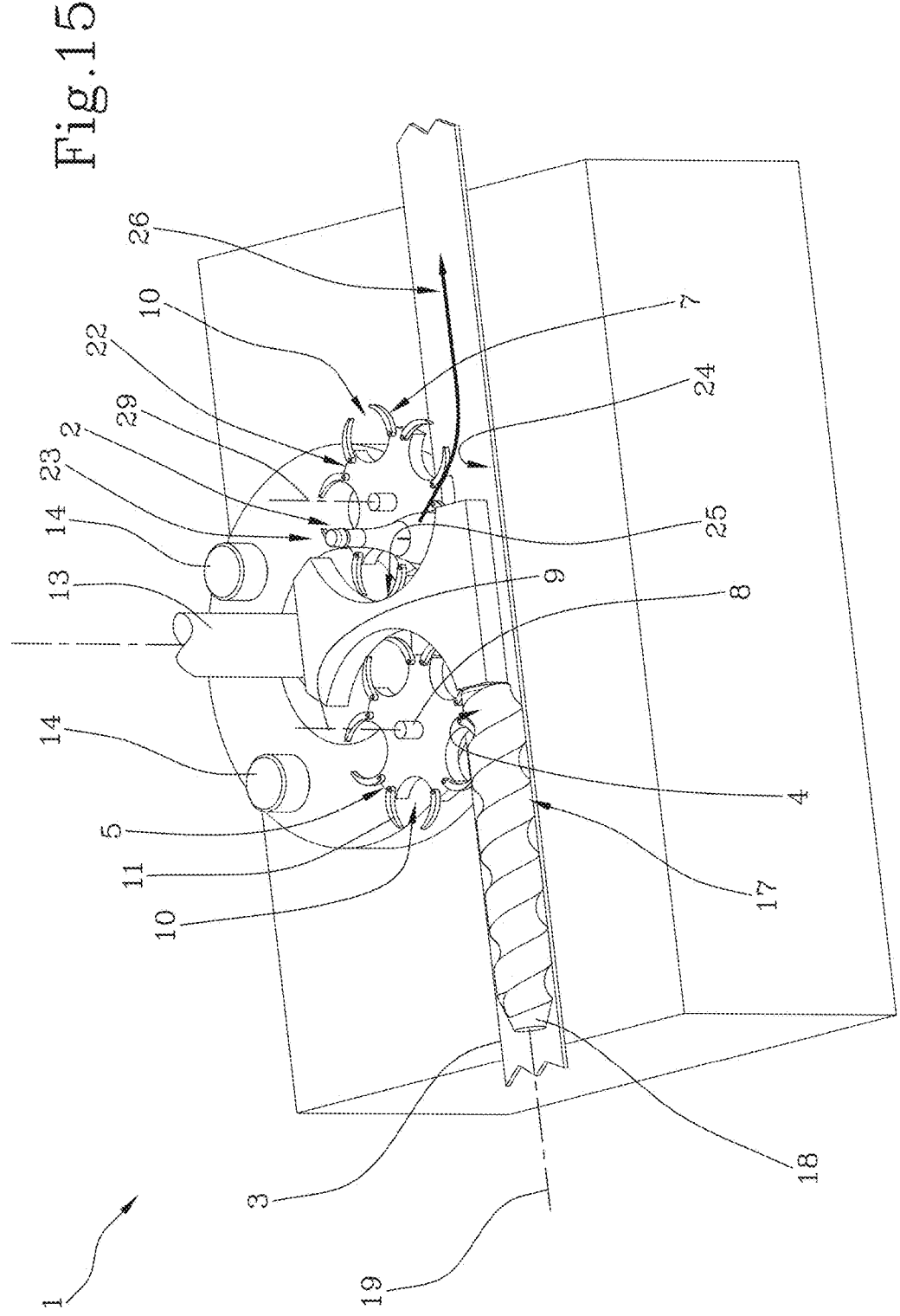
Figure 16:
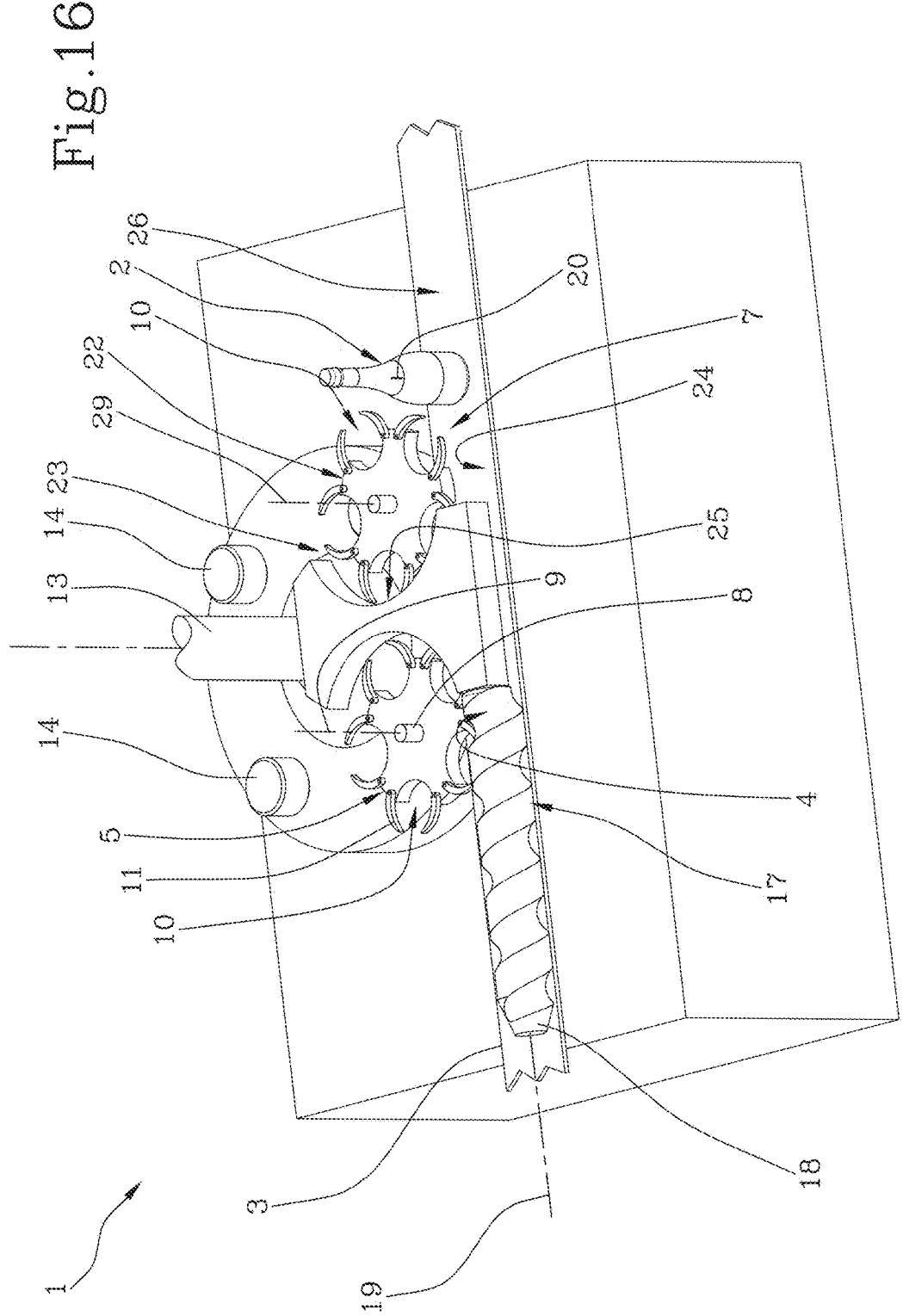
Figure 17:
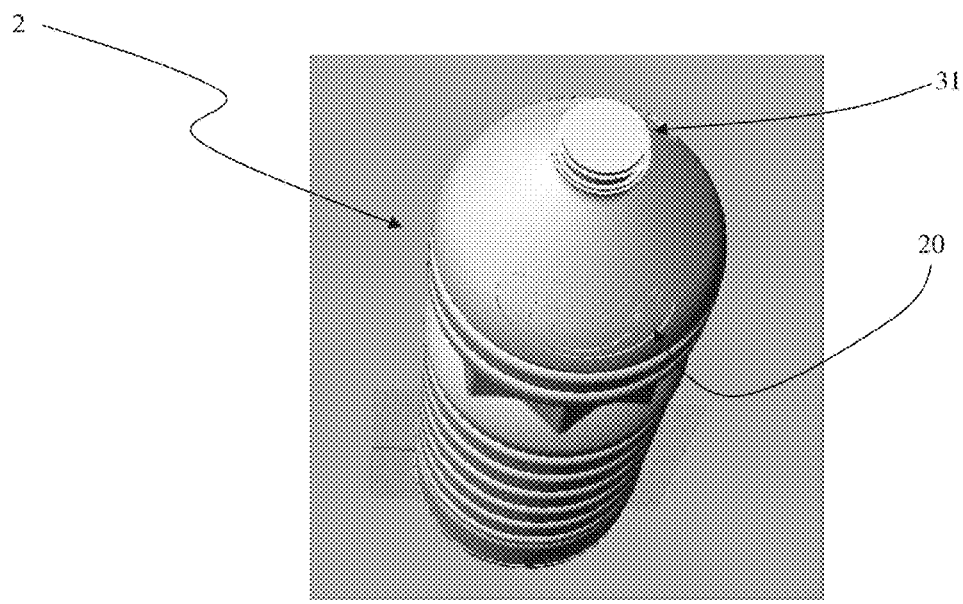
FIG. 17 shows an axonometric view of a container to be processed according to this invention.

More specifically, the method comprises a step of feeding the containers 2 to an infeed station 4 along the feed path (FIGS. 2 and 10).

Subsequently, the method comprises transferring one container 2 at a time from the infeed station 4 to the loading station 6 using the transfer unit 5 (FIGS. 3, 4, 11, 12).

The transferring step is accomplished by keeping the orientation of each container 2 fixed relative to the transfer unit itself during travel from the infeed station 4 to the loading station 6. Moreover, the transfer step comprises loading the container 2 onto a support 14 of the carousel 12 when the support 14 is positioned at the loading station 6.

According to this invention, the method comprises detecting the initial orientation of each container 2, relative to the central axis of extension thereof, at a position of the container 2 upstream of the loading station 6 in the carousel 12 along the feed path. Moreover, the method comprises calculating the angle of rotation of the support 14 in order to turn the container 2 loaded thereon to a predetermined final orientation as a function of the initial orientation detected and of the movement imparted by the transfer unit. Lastly, the method comprises a step of rotating the support 14 by the calculated angle of rotation after the container 2 has been placed on the support 14 so as to turn the container 2 to the predetermined final orientation.

Preferably, the detecting step occurs at the infeed station 4. In detail, the detecting step occurs outside the horizontal edge of the carousel 12.

Even more preferably, the detecting step occurs from above relative to each container 2 in such a way that the detector 19 is positioned above the container 2 and facing a top of the latter.

FIGS. 1a, 5, 9a and 13 shows the step wherein the support 14 of the carousel 12 rotates by the calculated angle in such a way as to reach the predetermined final orientation.

More specifically, the step of detecting the initial orientation of the container comprises a sub-step of processing the image captured by the detector 19 scanning the peripheral area around the top or mouth or cap 31 of the container 2 present in the image and corresponding to the lateral surface of the container 2. In that way, it is possible to determine the initial orientation of the container 2 as a function of a "spot" 20 located on the lateral surface.

The invention achieves the preset aims.

More specifically, the machine 1 for moving the containers 2 reduces the dimensions for the support 14 of the sensor along the edge of the carousel 12 since no support 14 is present for the sensor along the carousel 12 as the sensor is located upstream of the loading station 6.

Moreover, this invention allows the timing and the spaces for detecting the orientation of the container 2 to be optimized. In effect, when the container 2 is introduced into the carousel 12 the relative orientation is recognised and also the angle of rotation necessary to carry it to the final predetermined orientation. In addition, once the container 2 has been loaded on a support 14, the latter is rotated only by the angle necessary to carry it to a final position and does not need a complete initial rotation for the scanning of the lateral surface (as in the prior art). Consequently, the complete operation for positioning the container 2 in the final orientation occupies an angle of carousel 12 less than that of the prior art.

Lastly, since the detector 19 is applied upstream of the loading station 6 and outside of the carousel 12, it is possible to detect the container 2 from the top downwards in such a way as to detect a "spot 20" of the container 2 present at a relative top or lateral surface.

The invention claimed is:

1. A machine for moving containers to be processed along a feed path, comprising:
    infeed means for feeding the containers to an infeed station;
    an infeed transfer unit located at the infeed station and configured to take the containers in one at a time and carry the containers to a loading station along the feed path;
    the transfer unit comprising retaining means for keeping the position of the containers relative to the transfer unit itself so that the orientation of each container referred to its own main axis of extension is maintained as each container is carried from the infeed station to the loading station;
    a carousel rotatable about its rotation shaft and comprising a plurality of rotatable supports arranged around its periphery to support the respective containers;
    the carousel being mounted at the loading station and being synchronized in movement with the infeed transfer unit in such a way that each container unloaded by the transfer unit is placed on a respective support of the carousel;
    means for moving each support and configured to make each support rotate on itself through an angle of rotation during the movement of the carousel;
    a detector configured to detect an image of each container and positioned upstream of the loading station in the carousel along the feed path;
    the detector being positioned above the containers and being configured to detect an image of each container from the top downwards;
    a control unit operatively connected to the detector and to the means for moving each support of the carousel and configured to:
        receive the image of the container detected by the detector;
        determine the orientation of each container relative to the central axis of extension thereof;
        calculate the angle of rotation of the support in order to turn the container loaded thereon to a predetermined final orientation as a function of the initial orientation detected and of the movement imparted by the transfer unit;
        drive the movement means so as to rotate the support by the calculated angle of rotation after the container has been placed on the support so as to turn the container to the predetermined final orientation;
    wherein the control unit is configured to:
    scan a peripheral area around the top or mouth or cap of the container present in the image detected by the detector corresponding to a lateral surface of the container so as to determine the initial orientation of the container as a function of a distinctive mark positioned on the lateral surface;
    calculate the angle of rotation of the support also as a function of the movement imparted by the transfer unit for carrying the container from a detection zone to the loading station, wherein the detector detects the initial orientation of the container.

2. The machine according to claim 1, wherein the detector is positioned between the infeed station and the loading station along a stretch of path for feeding the container positioned at the transfer unit; the transfer unit comprising a plurality of housings for housing respective containers wherein each housing is positioned at a lower part of the container in such a way as to leave free most of the side wall of the container for the detection.

3. The machine according to claim 1, wherein the detector is located at the infeed station.

4. The machine according to claim 1, wherein the detector is configured to receive rays for detecting the framed image of the container; the detector comprising a deflection system for deflecting the rays of the framed image and configured to detect an image of the side walls of the framed container.

5. The machine according to claim 4, wherein the deflection system comprises:
    a telecentric lens; and/or
    one or more Fresnel lenses; and/or
    one or more hypercentric lenses; and/or
    a system of hypercentric lenses and/or a cylinder having a reflecting inside lateral surface.

6. The machine according to claim 1, wherein the detector is an image detector, preferably a still camera or a video camera.

7. The machine according to claim 1, wherein the transfer unit comprises:
    a star wheel rotating about its axis of rotation and having a plurality of housings arranged around its periphery to house the containers to be transferred;
    the retaining means being positioned at each housing in such a way as to keep the container in a position inside the housing;
    the rotary starwheel being synchronised with the movement of the carousel in such a way as carry one container at a time to respective supports of the carousel.

8. The machine according to claim 1, further comprising:
    spacing means for spacing the containers, operatively connected to the infeed means and extending along at least part of the infeed means as far as the infeed station in order to space one container from another before it reaches the infeed station.

9. The machine according to claim 1, further comprising:
    an outfeed transfer unit synchronized in movement with the carousel and configured to remove the containers one at a time from the supports of the carousel at an unloading station spaced from the loading station along the feed path;
    the outfeed transfer unit being configured to carry each container picked up to an outfeed station; the machine comprising outfeed feeding means extending away from the outfeed station and configured to carry each container away from the carousel.

10. The machine according to claim 1, wherein:
    the carousel comprises a plurality of holding units for holding the containers and positioned above and at the supports of the carousel;

each holding unit being movable from a raised position to a lowered position relative to the container in such a way as to keep it pressed against the support following the loading of the container on the latter.

11. The machine according to claim 1, further comprising:
a further detector located along the perimeter of the carousel and downstream of the loading station to detect the final orientation of the container following its rotation on itself through the calculated angle; the control unit being connected to the further detector and being configured to:
receive the information on the final orientation of the container from the further detector;
process the information and calculate the angular deviation of the container between the final orientation detected and a predetermined theoretical final orientation;
drive the movement means so as to rotate the support by an angle corresponding to the calculated angular deviation in such a way as to turn the container to the theoretical final orientation.

12. A method for moving containers to be processed along a feed path, comprising the following steps:
feeding the containers to an infeed station along the feed path;
transferring one container at a time from the infeed station to a loading station using a transfer unit, wherein an orientation orientation of each container is kept fixed relative to the transfer unit itself during travel from the infeed station to the loading station;
the transferring step comprising loading the container onto a support of a carousel that is rotatable about its rotation shaft when the support is positioned at the loading station;
detecting an image of each container relative to the central axis of extension thereof at a position where the container is upstream of the loading station in the carousel along the feed path;
determining the orientation of each container relative to the central axis of extension thereof;
calculating an angle of rotation of the support in order to turn the container loaded thereon to a predetermined final orientation as a function of the initial orientation detected and of the movement imparted by the transfer unit;
rotating the support by the calculated angle of rotation after the container has been placed on the support so as to turn the container to the predetermined final orientation;
wherein the step of determining the initial orientation of the container comprises a sub-step of:
processing the image captured by the detector scanning the peripheral area around the top or mouth or cap of the container present in the image and corresponding to the lateral surface of the container so as to determine the initial orientation of the container as a function of a recognition mark on positioned on the lateral surface;
calculating the angle of rotation of the support as a function of the movement imparted by the transfer unit for carrying the container from a detection zone, wherein the detector detects the initial orientation of the container in the detection zone, to the loading station.

* * * * *